United States Patent
Christler

Patent Number: 5,996,191
Date of Patent: Dec. 7, 1999

[54] HOOKLESS CONNECTING RING

[76] Inventor: Tony M. Christler, 7872 SW. Edgewater, Wilsonville, Oreg. 97072

[21] Appl. No.: 09/118,770

[22] Filed: Jul. 18, 1998

[51] Int. Cl.⁶ .................................................. A44B 15/00
[52] U.S. Cl. .............................. 24/598.2; 24/36; 70/458
[58] Field of Search .............................. 24/598.2, 598.1,
24/910, 907, 7, 3.12, 36, 17 B, 17 AP,
16 PB, 22, 23 EE, 27, 67.3, 67 R, 67.9,
563–567, 570; 70/458, 456 R; 59/82, 84,
85, 87, 90; 285/321

[56] References Cited

U.S. PATENT DOCUMENTS

| | | | |
|---|---|---|---|
| 298,747 | 5/1884 | Haff | 24/598.2 X |
| 812,458 | 2/1906 | See | 24/598.2 X |
| 1,232,626 | 7/1917 | Trieschmann | 70/458 |
| 1,286,273 | 12/1918 | Gariss . | |
| 1,286,501 | 12/1918 | Bauer . | |
| 1,526,498 | 2/1925 | Jung . | |
| 2,432,870 | 12/1947 | Evalt | 24/16 PB X |
| 3,061,999 | 11/1962 | O'Brien | 24/598.2 X |
| 3,745,800 | 7/1973 | Zentmyer | 70/458 |
| 4,677,835 | 7/1987 | Almblad . | |
| 4,847,955 | 7/1989 | Stephenbs, Jr. | 24/3.6 |
| 5,139,144 | 8/1992 | Robert, Jr. | 40/458 X |
| 5,197,316 | 3/1993 | Gottlieb et al. . | |
| 5,638,713 | 6/1997 | Roth et al. . | |

*Primary Examiner*—James R. Brittain
*Assistant Examiner*—Robert J. Sandy
*Attorney, Agent, or Firm*—Birdwell & Janke, LLP

[57] ABSTRACT

A hookless connecting ring. An elongate member having two ends is formed in a loop defining axial and circumferential directions. The loop, in the absence of any applied forces, forms a closed configuration of the connecting ring in which the loop is in state of relaxation and the ends assume an overlapping relation for closing the loop. The ends remain, however, freely displaceable from one another along the axial and circumferential directions and depend on substantially elastic restoring forces in the member to maintain the closed configuration.

7 Claims, 1 Drawing Sheet

HOOKLESS CONNECTING RING

BACKGROUND OF THE INVENTION

The present invention relates to a connecting ring, particularly a connecting ring that does not require a hook or clasp for forming a closed and locked configuration thereof.

Connecting rings, of which key rings are typical examples, are often provided with two parts that pivot open to form an open configuration of the connecting ring for receiving one or more articles having apertures therein, such as keys, the parts pivoting together to form a closed configuration that is locked with a clasp or latch. As an example of an attempt to minimize manufacturing costs in a connecting ring, Jung, U.S. Pat. No. 1,5265,498 proposes forming a key ring of a single piece of material, the piece of material being resilient so that, by flexing the material, interlocking teeth at the ends of the material may be engaged and disengaged for locking and unlocking the ring, respectively.

Many other connecting rings have been proposed employing variations of the concept of Jung. However, these typically require some form of interlocking, hooking or clasping mechanism. This complicates the structure of the connecting ring, increasing manufacturing cost and decreasing ease of use.

Accordingly, there is a need for a hookless connecting ring that decreases cost and manufacture and increases ease of use.

SUMMARY OF THE INVENTION

The hookless connecting ring of the present invention solves the aforementioned problems and meets the aforementioned needs by employing an elongate member having two ends and formed in a loop defining axial and circumferential directions. The loop, in the absence of any applied forces, forms a closed configuration of the connecting ring in which the loop is in state of relaxation and the ends assume an overlapping relation for closing the loop. The ends remain, however, freely displaceable from one another along the axial and circumferential directions and depend on substantially elastic restoring forces in the member to maintain the closed configuration.

Therefore, it is a principal object of the present invention to provide a hookless connecting ring.

It is another object of the present invention to provide a hookless connecting ring that decreases manufacturing costs.

It is still another object of the present invention to provide a hookless connecting ring that increases ease of use.

The foregoing and other objects, features and advantages of the present invention will be more readily understood upon consideration of the following detailed description of the invention, taken in conjunction with the following drawings.

DETAILED DESCRIPTION OF THE PREFERRED EMBODIMENT

Figure 1:
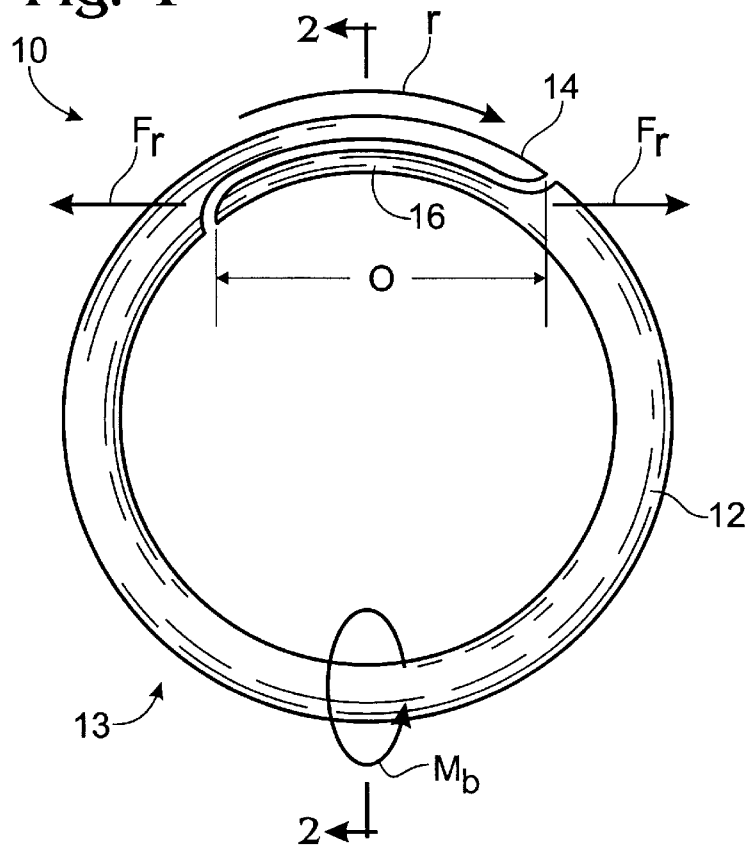
FIG. 1 is a plan view of a hookless connecting ring according to the present invention.
Figure 2:
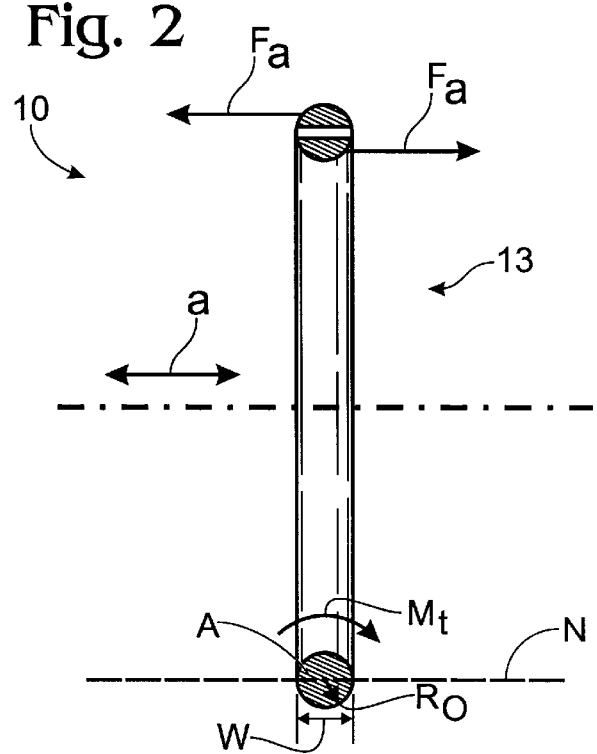
FIG. 2 is a cross-section of the hookless connecting ring of FIG. 1, taken along a line 2—2 thereof.

Referring to FIGS. 1 and 2, a preferred embodiment of a hookless connecting ring 10 according to the present invention employs an elongate length of material 12 that is formed in a loop 13. The loop is shown as being circular, but may have other geometries. The loop defines a circumferential direction "r" and an axial direction "a" as shown in FIGS. 1 and 2, respectively. As shown by the two arrows in FIG. 2, the axial direction "a" includes a positively directed component "$a_1$", defining a positive axial direction, and a negatively directed component "$a_2$" defining a negative axial direction. Preferably, the material 12 is formed as a single piece; however, the material may be formed of a combination of pieces without departing from the principles of the invention. The ring 10 may be employed for carrying articles having apertures therethrough, through which the material 12 is threaded, such as keys. The ring 10 may be employed for carrying or connecting other articles, either having apertures therethrough or not, for example, the ring 10 may also be employed for carrying or confining elongate articles, such as computer cables, which are contained within the loop 13.

The material 12 has two ends 14 and 16. In the absence of any applied forces to the ends, the ends overlap one another circumferentially by an amount "o," and axially by an amount "w" to form a closed configuration of the loop and connecting ring. In their overlapping relation, the ends need not touch one another, as shown in the Figures, to form the closed configuration. In the closed configuration, the loop is in a state of relaxation and the ends are displaceable from one another, preferably along both the axial and circumferential directions, against a restoring force of the material. For purposes herein, a restoring force is a force exerted by the material in response to a stress applied thereto for which the material substantially remains elastic, i.e., is not permanently strained or deformed a substantial amount.

As explained more fully below, preferably, one of the directions is selected to be a preferential direction for opening the connecting ring and the connecting ring is adapted so that opening it along the other direction is made relatively difficult. It is an outstanding advantage of the invention that this latter purpose need not be accomplished by employing hooks, tongues, grooves or other interlocking means for catching the ends or interlockedly locking the ends together.

Preferably, the connecting ring 10 is adapted so that it opens preferentially along the axial direction rather than the circumferential direction, so that use of the connecting ring with one hand is facilitated, particularly with the thumb, forefinger and index finger, leaving the other hand free to manipulate an article to be connected to the ring. Where the connecting ring is adapted for opening preferentially in the axial direction, excessive opening in the circumferential direction represents an undesirable condition whereupon articles contained within the ring or on the ring may become accidentally detached. However, the connecting ring may be adapted to open preferentially in either direction, or in neither direction, without departing from the principles of the invention, and the following discussion is general.

To open the connecting ring 10 in either the axial or circumferential directions, the ends are displaced sufficiently along the selected direction to permit an article to which a connection is desired to pass therebetween. The connection may be either for connecting the article to the ring or connecting the ring to the article. The article may then be passed through the loop, or one of the ends 14 and 16 may be inserted through the article, such as by being threaded through the aperture in a key. In the latter circumstance, the article or the loop or both are moved relative to one another to move the end and the article apart until the article clears the other end. Finally, the ends are released so that the loop is permitted to relax into its closed configuration.

An axially directed force couple $F_a$ as shown in FIG. 2 may be applied to the ends for the above purpose. The force couple establishes a torsional moment $M_t$ and a consequent torsional stress in the loop. Where this stress is sufficient to displace the ends by an amount greater than the width "w", the connecting ring opens along the axial direction. For a linear stress-strain response to the force couple, the ends are displaced apart from each other as a result of this moment approximately by an amount that is inversely proportional to the polar moment of inertia of the cross-section "A" ("torsional moment of inertia") and the shear modulus of the material.

Similarly, a circumferentially directed force couple $F_r$ as shown in FIG. 1 applied to the ends establishes a bending moment $M_b$ and a consequent bending stress in the loop. Where this is sufficient to displace the ends apart an amount greater than the circumferential overlap "o" thereof, the connecting ring opens along the circumferential direction. For a linear stress-strain response to the force couple, the ends are displaced apart from each other as a result of this moment approximately by an amount that is inversely proportional to the moment of inertia about the neutral axis "N" of the cross-sectional area A ("bending moment of inertia") and the modulus of elasticity of the material ("elastic modulus").

Therefore, over a range of deformations in which the material exhibits a substantially linear stress-strain dependence, it is generally more difficult to displace the ends apart a small amount in the axial direction than in the circumferential direction in proportion to the ratio of the product of the bending moment of inertia and the elastic modulus divided by the product of the torsional moment of inertia and the shear modulus, and vice versa.

There is no precise relationship between the elastic modulus and the shear modulus for help in defining more particularly the above relationship. However, for many materials the elastic modulus is roughly about 2–3 times the shear modulus. On the other hand, for a circular cross-section the torsional moment of inertia is twice the bending moment of inertia. Therefore, the effects of the differences in moduli and moments of inertia for the two directions come close to canceling each other out. In practice, particular selections of loop geometries, including loop cross-sections that may vary along the loop, and the materials employed for the loop must be considered for their elastic effects particularly. Moreover, the material 12 may exhibit other than a substantially linear stress-strain relationship over the range of movements contemplated for the connecting ring 10 without departing from the principles of the invention. The above illustrative analysis may be inappropriate for non-linear stress-strain relationships.

Notwithstanding any preference of the connecting ring 10 for opening in one direction or the other as a result of its geometry and the mechanical properties of the material 12, the connecting ring may be provided with an additional bias for enhancing or overcoming this preference. This may be introduced by adjusting the relative amounts of overlap of the ends 14 and 16 along each direction, and is preferably introduced by adjusting the amount of the circumferential overlap "o". Where the material 12 as configured as shown in FIGS. 1 and 2 is formed of acetal, good results have been obtained by making the amount of the overlap "o" about four times the width of the material "w".

As it will be immediately apparent to one of ordinary skill in the art, where it is desired to adjust the axial overlap, one or both ends 14 and 16 may be provided with additional material forming additional axial overlap, or may have decreased amounts of material providing for decreased axial overlap.

The elastic modulus, the shear modulus, the strength and cross-sectional shape of the material may all be manipulated along with either or both an axial and a circumferential overlap, to provide that the connecting ring opens preferentially along one axis as compared with the other, though such manipulation is not necessary for practicing the invention.

It has been found that acetal provides good performance in the hookless connecting ring. Moreover, plastic resins generally have the additional advantage, where high quantities of the connecting ring are desired, of being economically produced in molds. However, the principles as aforedescribed are not material specific, and any material that has elastic properties over the desired range of opening of the connecting ring may be employed.

It is to be recognized that, while a specific hookless connecting ring has been shown and described as preferred, other configurations could be utilized, in addition to configurations already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. A connecting ring, comprising an elongate member having two ends and formed in a loop defining positive and negative axial directions and a circumferential direction, said loop in the absence of any applied forces forming a closed, relaxed configuration of the connecting ring in which said ends assume a circumferentially overlapping relation and in which each of said ends is displaceable from the other of said ends along either said positive or said negative axial directions without contact between said ends.

2. The connecting ring of claim 1, wherein said member is formed of a single piece of plastic.

3. The connecting ring of claim 2, wherein said plastic is an acetal.

4. The connecting ring of claim 1, wherein said loop has a circular shape.

5. The connecting ring of claim 1, wherein said loop, in the absence of any applied forces forms a closed, relaxed configuration of the connecting ring in which said ends assume an axially overlapping relation, wherein the amount of circumferential overlap is greater than the amount of axial overlap.

6. The connecting ring of claim 1, wherein said loop, in the absence of any applied forces forms a closed, relaxed configuration of the connecting ring in which said ends assume an axially overlapping relation, wherein said loop is adapted so that a greater force is required to cause said ends to assume a nonoverlapping relation in said circumferential direction than in said axial direction.

7. The connecting ring of claim 1, wherein said ends overlap one another so as to be spaced apart from one another.

* * * * *